United States Patent [19]

Guerindon et al.

[11] Patent Number: 5,193,065
[45] Date of Patent: Mar. 9, 1993

[54] SYSTEM FOR REQUISTIONING AND DISTRIBUTING MATERIAL IN A MANUFACTURING ENVIRONMENT

[75] Inventors: Pierre C. Guerindon, Peoria; Jon E. Barrow, Naperville, both of Ill.

[73] Assignee: Caterpillar Inc., Peoria, Ill.

[21] Appl. No.: 621,662

[22] Filed: Dec. 3, 1990

[51] Int. Cl.$^5$ .............................................. G06F 15/46
[52] U.S. Cl. .................................... 364/468; 364/478
[58] Field of Search .............. 364/401, 403, 468, 478, 364/479

[56] References Cited

U.S. PATENT DOCUMENTS 4,669,047 5/1987 Chucta ................................ 364/468
4,827,423 5/1989 Beasley et al. ...................... 364/468

OTHER PUBLICATIONS

"Material Handling: Japan's Kanban vs. MRP II", Instruments and Control Systems, vol. 56, No. 3, Mar. 1983, Radnor, Pa., U.S., pp. 31-35, by J. B. Pujol.
"Informatique des Gestionnaires et Mini-Ordinateurs", Bulletin Scientific De L'Association De Ingenieurs Electriciens, vol. 88, Mar. 1975, Liege, Be, pp. 107-114, by L. Gicquello.
Magazine: Automotive Industries, Article: JIT VS. MRP: The Push-Pullers Call a Truce, by: D. Williams, Date: Jul., 1986, pp. 30-31.
Magazine: Modern Materials Handling, Article: How MRP II and JIT Work Together at DuPont, By: I. P. Krepchin, Date: Dec., 1986, pp. 73-76.
Paper: Trackless Requirements Planning-The Next Phase, By: W. A. Thurwachter et al., Date: Oct. 9-12, 1984, APICS 27th Conference, pp. 113-114.
Paper: Just-In-Time: A Goal for MRP II, By: W. E. Godard et al., Date: Oct. 9-12, 1984, APICS 27th Annual International Conference, pp. 149-151.
Advertisement, Actionline, vol. 9, Issue 7, Automotive Industry Action Group, Southfield, Mi., Jul. 1990 (Advertisement for Wagner Data Systems).
Seminar Session, Autotech '89, Detroit, Mi., Sep. 19-21, 1989, Electronic Kanban.
Magazine, Manufacturing Resource Planning, Article: Systems for Supporting the MRP/II/JIT Environment, By: A. Roa et al., Date: Summer, 1987 pp. 15-23.
Magazine, IE, Article: Implementing JIT with MRP II Creates Hybrid Manufacturing Environment, by: G. J. Bose et al., Date: Sep., 1988 pp. 49-53.
Book, Just-In-Time for America, Chapters 10 and 11, pp. 225-296, Written By: K. A. Wantuck, Published: 1989.
Book, World Class Manufacturing, The Lessons of Simplicity, Chapter 10, pp. 172-188, Written by: R. J. Schonberger, Published: 1986.

*Primary Examiner*—Jerry Smith
*Assistant Examiner*—Steven R. Garland
*Attorney, Agent, or Firm*—David M. Masterson

[57] ABSTRACT

A system for requisitioning and distributing material in a manufacturing environment is provided. A manufacturing station stores and utilizes the material and produces a first missing resource signal in response to depleting a predetermined amount of the material in the manufacturing station. An intelligent storage unit stores the material. A computer system receives the first missing resource signal, responsively searches the storage unit, produces a material transfer command signal in response to the presence of the material, and produces a pull trigger signal in response to the absence of the material. A microcomputer produces a material schedule. A logic device receives the pull trigger signal and produces a depletion signal in response to the pull trigger signal and the material schedule.

49 Claims, 3 Drawing Sheets

PRIOR ART
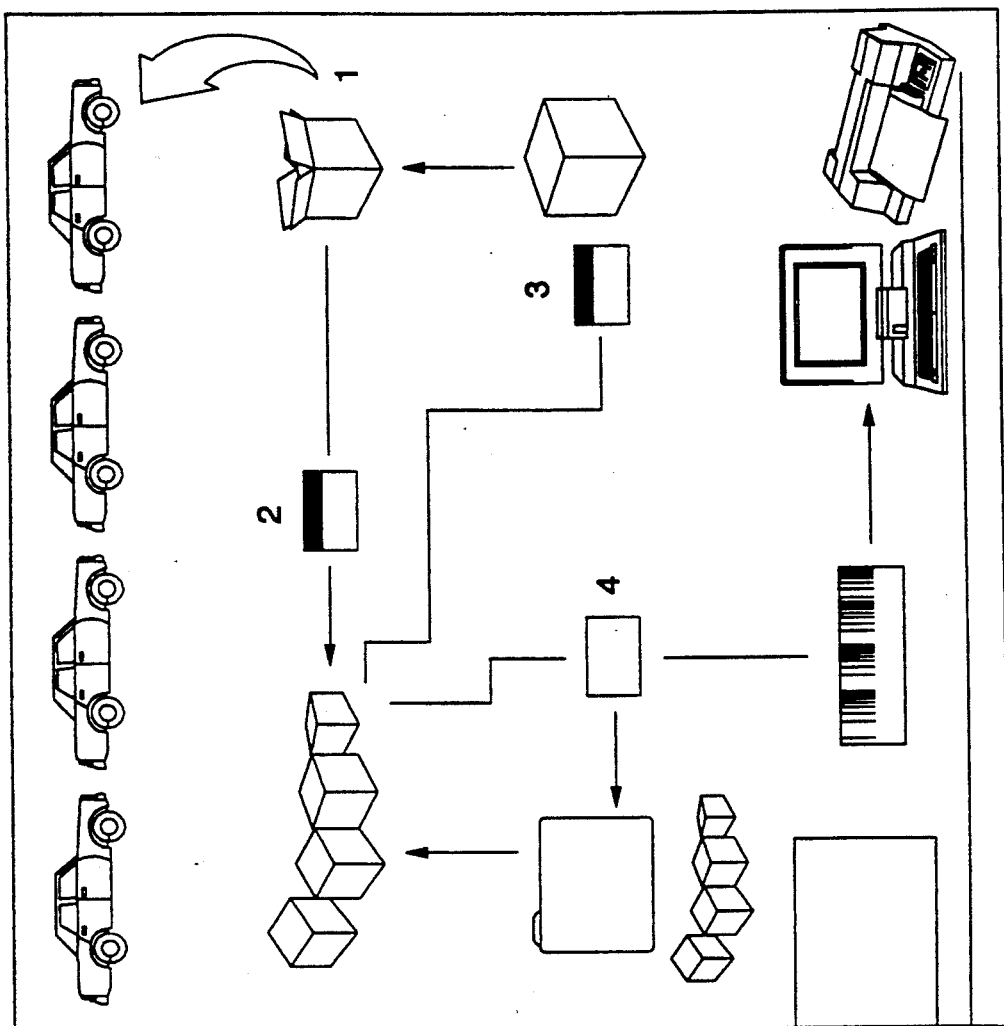
Fig-1
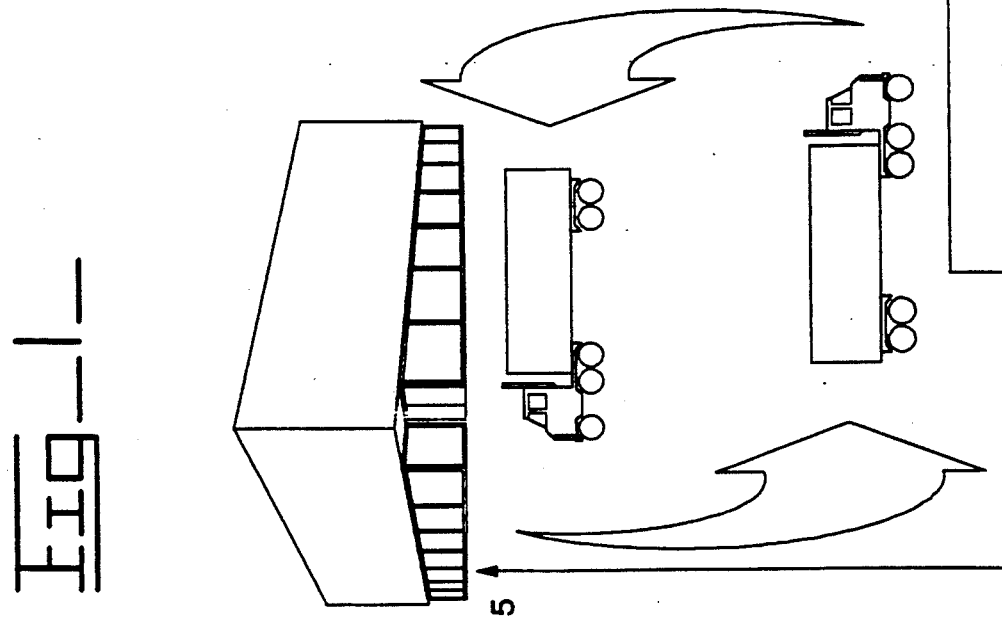

Fig_2_

SYSTEM FOR REQUISITIONING AND DISTRIBUTING MATERIAL IN A MANUFACTURING ENVIRONMENT

DESCRIPTION

1. Technical Field

This invention relates to a system for requisitioning and distributing material in a manufacturing environment and, more particularly, to a system for requisitioning material in response to a demand for the material and a schedule for the material.

2. Background Art

The process of manufacturing a product presents many challenges to bring the product to market for the least cost within schedule, while maintaining product quality. Manufacturing the product for the least possible cost is important in all industries. Inventory is one of the primary costs associated with manufacturing a product. Recent advances in manufacturing systems, utilizing proven Japanese techniques of production, try to plan the arrival of all components and material "Just-In-Time" (JIT) to manufacture a product, reducing inventory cost.

A number of books and articles have been published that address the issue of JIT. Among these are *Just In Time for America* by Kenneth A. Wantuck, published by The Forum, Ltd., Milwaukee, WI, and *World Class Manufacturing* by Richard J. Schonberger, published by The Free Press. These two books discuss JIT methods employed with Kanban (a type of signal that requests a maker to make and deliver more of a certain material to a user) for ordering material, and methods for order planning, based on customer demand. These methods involve MRP II (Manufacturing Resource Planning), which is discussed in the following paragraphs.

Wantuck discuses a planning method for resource allocation that is faster, easier, and more effective than traditional scheduling techniques—called uniform scheduling. Uniform scheduling starts with a production plan, and "levels" the material distribution in a manufacturing environment over a period of time, for example, every working day in a month. Eventually the uniform scheduling makes the material distribution the same for every hour. The best possible match between the uniform schedule and real customer orders is desired in order to have material delivered "Just-In-Time" for use at the point of manufacture. The JIT system strives to initiate production for discrete product quantities only when needed for customer orders. There is no lag time or excess material storage. The consumption of material triggers a series of events. The "triggering" is performed by a "Pull System". An example of a pull system is a system similar to that of Wagner Data Systems called the "Electronic Kanban" shown in FIG. 1.

The operation is as follows:

1. Parts are used on the assembly line until all the parts are distributed.

2. The empty parts container is discarded and a pull trigger is issued. In this case a line card with the corresponding part number is delivered to the reserve storage.

3. A container filled with the specified part is delivered to the point of use with the line card.

4. As production continues, a checker tallies the number of containers used and issues a second pull trigger to the Kanban Supplier when a specified number of containers are used. In this case a bar coded Kanban card, which specifies the part number and quantity, is read by a bar code reader, and an order is sent to the supplier via electronic data interchange.

5. The supplier receives the order and delivers the supply along with another bar coded Kanban card t the customer.

Wantuck describes another planning method, notably MRP II. Manufacturing Resource Planning (MRP II) was developed to match production levels to expected customer demand, and has primarily been employed in discrete, batch type manufacturing environments. MRP II is a "push" system that uses a production schedule to identify which particular products will be built and in what quantities. This production schedule is the basis for a material requirements plan which states when materials are required and in what quantities. The material is "pushed" through the system from the supplier to the manufacturing floor according to the plan. This material requirements plan determines labor requirements and costs of manufacturing, which have a significant impact on the financial and marketing plans of a manufacturer. The material requirements plan is usually run on a weekly or monthly basis and, therefore, often differs from the actual requirements for material at the point of manufacture. This is due to unplanned changes in demand for the product that occur between planning periods.

As shown in the article "Systems for Supporting the MRP II/JIT Environment" by Ashok Rao and David I. Scheraga, and "Implementing JIT With MRP II Creates Hybrid Manufacturing Environment" by Gerald J. Bose and Ashok Rao, a manufacturing system can integrate an MRP II planning system with a JIT execution system to form a hybrid system. The material can be "pulled" from the supplier while still being based on a production plan. This will be most successful with material that is used for repetitive manufacturing and scheduled uniformly. The MRP II philosophy can also plan JIT quantities in which the pull trigger is disabled and material is "pushed". Unfortunately, the desired results of these systems are not realized under true manufacturing conditions due to the attempted merging of the push and pull philosophies of MRP II and JIT, because of inherent problems associated with each planning method. For example:

(a) suppliers may not deliver material on time, rendering the point of manufacture non-operational;

(b) suppliers may deliver poor quality material which yields the material unusable, again rendering the point of manufacture non-operational;

(c) customers may give erratic demands and make changes that affect the material requirements plan resulting in excess material storage or a lag time in material delivery; and (d) production requirements may be neither truly repetitive nor truly discrete, propose difficulties in associating material with one of the planning methods. These variables hinder the successful performance of such a hybrid scheme.

Therefore, a system is needed which can adapt quickly in response to dynamic manufacturing conditions while insuring that material is delivered to the point of manufacture in a JIT manner resulting in low material inventory.

The invention also includes other features and advantages which will become apparent from a more detailed study of the drawings and specification.

DISCLOSURE OF THE INVENTION

In one aspect of the present invention, a system for requisitioning and distributing material in a manufacturing environment is provided. A manufacturing cell stores and utilizes the material and produces a first missing resource signal in response to depleting a predetermined amount of the material in the manufacturing cell. An intelligent storage unit stores the material. A computer system receives the first missing resource signal, responsively searches the storage unit, produces a material transfer command in response to the presence of the material, and produces a pull trigger signal in response to the absence of the material. A microcomputer produces a material schedule. A logic device receives the pull trigger signal and produces a depletion signal in response to the pull trigger signal and the material schedule.

BRIEF DESCRIPTION OF THE DRAWINGS

FIG. 1 is a block diagram of a prior art system.

BEST MODE FOR CARRYING OUT THE INVENTION

Figure 2:
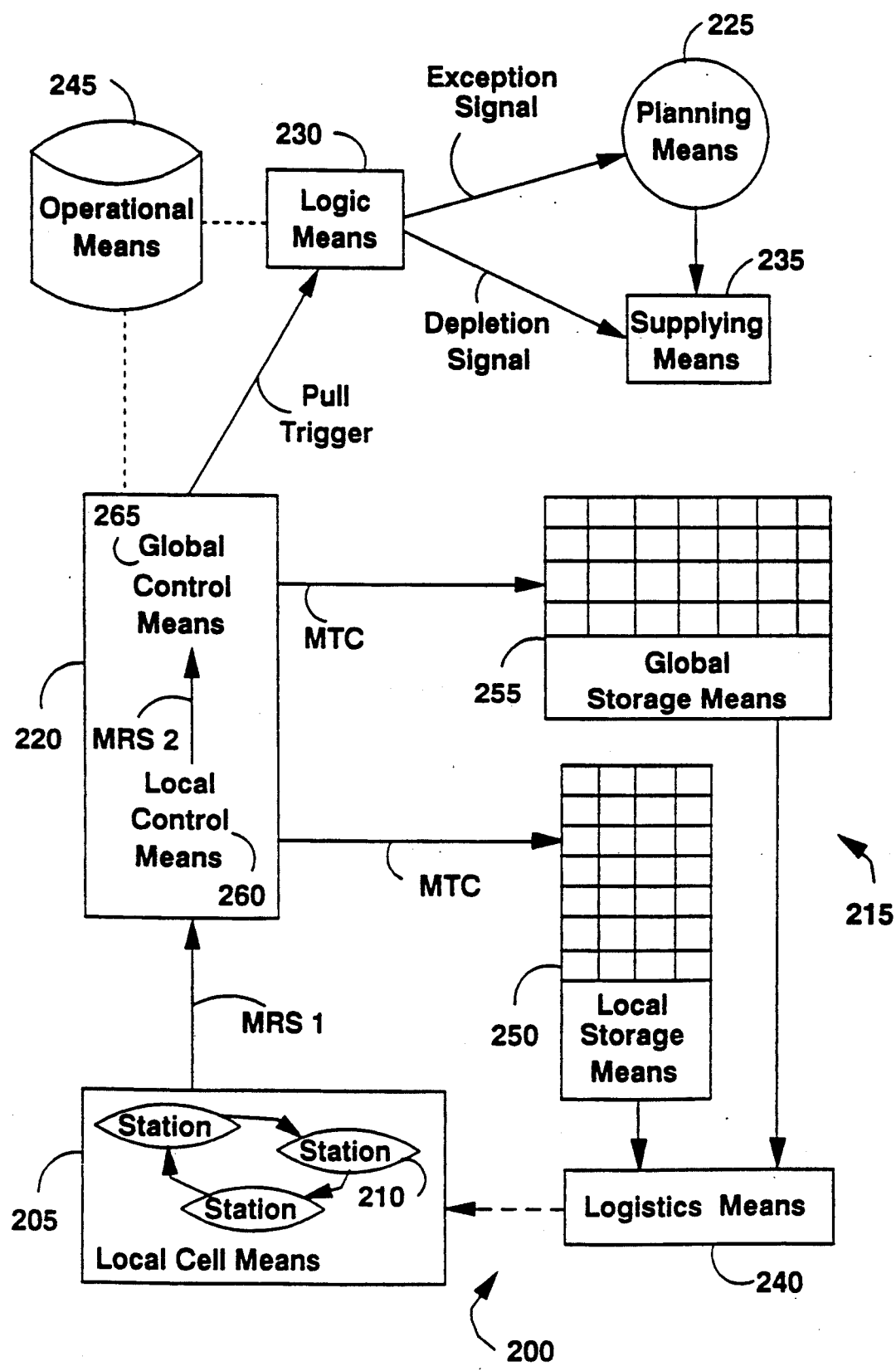
FIG. 2 is a block diagram of one embodiment of the present invention.

FIG. 2 depicts one embodiment of a system 200 for requisitioning and distributing material in a manufacturing environment. Preferably, the present invention is implemented using a computer system having at least one mainframe computer or a plurality of microcomputers, or the like.

The system 200 includes at least one local cell means 205 for storing and utilizing material and producing a first Missing Resource Signal (MRS) in response to depleting a predetermined amount of the material in the local cell means 205. As material is utilized or consumed by the local cell means 205 for manufacturing or assembly operations, a record of the amount of material is decremented. When the local cell means 205 consumes or depletes the predetermined amount of the material and requires more, the MRS is produced. The first MRS is an electronic signal generated in software that indicates the demand for a predetermined amount of a certain type of material in a predetermined time period.

Each local cell means 205 contains one or more manufacturing stations 210, at which a set of manufacturing or assembly operations are performed. The function of the local cell means 205 is to produce a specific product component or to perform an operation in the final product assembly. For example, the local cell means 205 may be a hydraulic cylinder manufacturing area or hydraulic cylinder assembly line. A station 210 within the local cell means 205 may preform installation of hydraulic hoses on the hydraulic cylinder.

The local cell means 205 contains limited storage space for holding material, therefore a storage means 215 is needed for storing material. The storage means 215 preferably includes an Automated Storage and Retrieval System (AS/RS) or the like. An AS/RS functions as an intelligent storage unit, and consists of racks or shelves. Also included in the AS/RS is an automated crane or robot for loading material into a specified location within the racks and retrieving the material from the racks when material is needed for the local cell means 205. Preferably the storage means 215 includes a microcomputer (not shown) that communicates with the system mainframe. Intelligent storage units such as the AS/RS are well known in the art and will not be further discussed.

The system 200 includes a control means 220 for receiving the first MRS, responsively searching the storage means 215, producing a Material Transfer Command Signal (MTC) in response to the presence of the material in the storage means 215, and producing a Pull Trigger signal in response to the absence of the material in the storage means 215. The control means 220 regulates material movement and utilization for the local cell means 205 and storage means 215. Preferably the control means 220 includes a computer system (not shown) electronically connected to the system mainframe, to the local cell means 205, and to the storage means 215.

A logistics means 240 receives the MTC and responsively moves the material from the storage means 215 to the local cell means 205. Preferably the logistics means 240 includes a microcomputer in communication with the system mainframe. The logistics means 240 may consist of forklift vehicles, self guided vehicles, automatic guided vehicles, conveyor systems, monorail systems, or various combinations thereof.

The system 200 includes a planning means 225 for producing a material schedule. The material schedule forecasts when material is required for the local cell means 205 and forecasts the quantity of material needed, over a predetermined time period. The planning means 225 classifies material into various types, in response to the demand for the material as reflected by the material schedule and to the cost of the material. The material schedule contains such information as the material type classifications along with the amount of material to be ordered and the expected delivery date. When production varies for any reason, the material schedule may require modification. The planning means 225 produces the material schedule based on demand for the final product. The demand for the final product may be actual customer demand or predicted customer demand. Preferably the planning means 225 includes a microcomputer (not shown) in communication with the system mainframe. More specifically, the material schedule specifies the amount of material required for each local cell means 205 over the next planning period, the lot size of the required material, and the delivery date for the lots of required material. Typically, the planning period is between one week and one month.

A logic means 230 receives the Pull Trigger signal and produces a depletion signal in response to the Pull Trigger signal and the material schedule. Preferably the logic means includes a computer system (not shown) in communication with the system mainframe and is implemented in software. The logic means 230 compares the demand for the material, indicated by the Pull Trigger signal, with the plan for the material in the material schedule, and determines if a depletion signal should be issued. The determination is based on information given in the Pull Trigger signal (the material part number and the quantity needed) and the information included in the material schedule (the the type classification and the expected demand for the material). Advantageously, the depletion signal is an electronic signal generated by software and delivered such media as electronic data interchange, facsimile, or telephonic. If the Pull Trigger signal indicates a demand for material which does not match the planned demand specified by the material schedule, the logic means 230 produces an exception signal. The logic means 230 delivers the exception signal to the planning means 225. The exception signal is another type of signal generated in software indicating a deviation from the material schedule. The planning means 225 receives the exception signal and responsively modifies the material schedules to incorporate information into the material schedule for future planning periods.

The system 200 includes a supplying means 235 for producing material utilized by the local cell means 205. The supplying means 235 provides the material based on the material type and the material demand, indicated by the material schedule. The supplying means 235 delivers the material upon receipt of the depletion signal or as provided, upon indication by the material schedule, or a combination thereof. There may be more than one supplying means 235, which may be either internal or external to the system 200. External supplying means exist outside the manufacturing environment of the system 200 for supplying "purchased material". For example, external supplying means may consist of other companies or suppliers, or another plant within the same company. Internal supplying means may consist of other local cell means 205 which reside within the system 200 for supplying "worked material". For example, one local cell means 205 may produce material utilized by another local cell means 205.

The system 200 includes an operational means 245 for maintaining an inventory list corresponding to the material contained in the local cell means 205 and the storage means 215. The inventory list includes such information as the part numbers of the material, the quantity available in the storage means 215, and the location of the material within the storage means 215. The operational means 245 consists of a data base integrated into the controlling software of the system 200 located in the system mainframe. The control means 220 accesses the data base to determine the amount of material stored in the local cell means 205 and the storage means 215, and updates the inventory list when the MTC or Pull Trigger signal is produced, or when material is utilized by the local cell means 205.

The local cell means 205 may have one of two material replenishment methods, which are determined by the type classification of the material and the material usage. One method for replenishing material is producing the first MRS in response to the amount of material in the local cell means 205 being equal to a predetermined value. Material is monitored as it is utilized in the local cell means 205 by one of several methods, such as a photocell (not shown) which monitors the movement of material past a particular point on an assembly line. As the material passes the particular point, the photocell delivers an electronic signal to the control means 220 indicating that an operation is complete and material for that operation has been used. Another method for monitoring material is having a worker enter a keystroke to a computer terminal (not shown) used to manually interface with the control means 220. The keystroke indicates that an operation is complete, again signifying the use of the material. Regardless of the method of monitoring the material, the inventory list of material associated with the local cell means 205 is decremented. The planning means 225 determines a minimum and maximum value corresponding to the amount of material to be maintained in the local cell means 205. The minimum value is based on the lead time of the material, or the amount of time required to deliver the material from the supplying means 235 to the local cell means 205. When the amount of material in the local cell means 205 corresponding to the predetermined minimum value, the first MRS signal is produced which requests material in an amount equal to the difference between the predetermined minimum value and the predetermined maximum value.

Another method for replenishing material is producing the first MRS in response to a predetermined time at which the material in the local cell means 205 is expected to be depleted. Advantageously, the control means 220 applies future demand (actual scheduled material) to the quantity of material stored in the local cell means 205. For example, the control means 220 calculates the length of time material will remain in the local cell means 205 before more material is expected to be needed. When this length of time is equal to the lead time, the first MRS signal is produced requesting material in an amount equal to the planned lot size. Preferably, both of the replenishment methods are implemented in software within the control mean 220. The replenishment methods are well known in the art and will not be discussed in any further detail.

In the preferred embodiment, the material is classified as either type 0, 1, 2, 3, or 4. An advantage to using the material type classifications, is that the manufacturing environment exhibits the flexibility to gradually adapt the system 200 to the supplying means 235, as the supplying means 235 is able to deliver material in response to the depletion signal. The type classifications gradually increase from the "push" type 0 to types 1, 2, and the most advanced "pull" type 4. In this example, type 3 is reserved for prepackaged nuts and bolts kind of material. The material type is based on the demand for the material and the material cost, and is part of the information indicated by the depletion signal. A more detailed discussion of an example of material type classifications is provided below. In the following discussion, the material type classifications are associated with the external supplying means; however, the material type classifications associated with the internal supplying means are applied in an equally similar manner.

Type 0 material is ordered strictly according to the material schedule and is not affected by the depletion signal. Material is classified as type 0 until the supplying means 235, for the particular kind of material, is equipped to receive Pull Trigger signals.

Types 1, 2, and 4 are also planned by the material schedule; however, the logic means 230 can advance the delivery date of an order in response to the depletion signal. Although type 1 material orders can be advanced, type 1 material orders cannot be delayed; however, both types 2 and 4 material orders can be delayed. Another difference between type 1 material, and types 2 and 4 material is that the suppling means 235 is authorized to deliver type 1 material according to the material schedule. Conversely, the suppling means 235 cannot deliver types 2 and 4 material until a depletion signal is received—regardless of the material schedule delivery date. Therefore, the material delivery date becomes a planned delivery date only. This exemplifies the change from a "push-type" system to "pull-type" system. That is, the supplying means 235 delivers type 1 material according to the date specified by the material schedule (push type); whereas, types 2 and 4 are not delivered until a depletion signal is received by the supplying means 235 (pull-type). The difference between material types 2 and 4 is that with type 4 material, the logic means 230 can also specify the quantity ordered in the depletion signal. Typically, types 1, 2, and 4 material are moderate to high in cost.

Type 3 material is ordered only by the depletion signal, and therefore is a "pull-type" material. The depletion signal associated with type 3 material specifies the quantity and the delivery date of the material. Typically, type 3 material is low in cost and is used in high quantities.

The control system 200 is not limited to the material types presented and deviations from the material types may be desirable.

Preferably, the storage means 215 includes a local storage means 250 for storing the material used by the local cell means 205, and a global storage means 255 for temporarily storing the material. The global storage means 255 stores material ordered according to the material schedule that is not immediately needed by the local cell means 205. Additionally, the control means 220 includes a local control means 260 for receiving a first MRS, responsively searching the local storage means 250, producing the MTC in response to the presence of the material in the local storage means 250, and producing a second MRS in response to the absence of the material in the local storage means 250. The control means 220 also includes a global control means 265 for receiving the second MRS, responsively searching the global storage means 255, producing a MTC in response to the presence of the material in the global storage means 255, and producing a Pull Trigger signal in response to the absence of the material in the global storage means 255.

For example, the local control means 255 receives the first MRS signal and then accesses the database contained in the operational means 245 to obtain the inventory list associated with the local storage means 255. If the required material is located, the local control means 260 delivers the MTC to the logistics means 240 to move the material from the local storage means 250 to the requesting local cell means 205. If the material is not located, the second MRS signal is produced by the local control means 260 and delivered to the global control means 265. The global control means 265 is over the local control means 255 in the system hierarchy, and electrically communicates with the local control means 250. The global control means 265 receives the second MRS from the local control means 260 and accesses the database contained in the operational means 245 to obtain the inventory list associated with the global storage means 255. If available material is located, the global control means 265 delivers the MTC to the logistics means 240 to move the material from the global storage means 255 to the requesting local cell means 205. If material is not located, the global control means 265 delivers the Pull Trigger signal to the logic means 230. Additionally, either the Pull Trigger signal or the MTC is delivered to the operational means 245 for updating the material inventory list.

Figure 3:
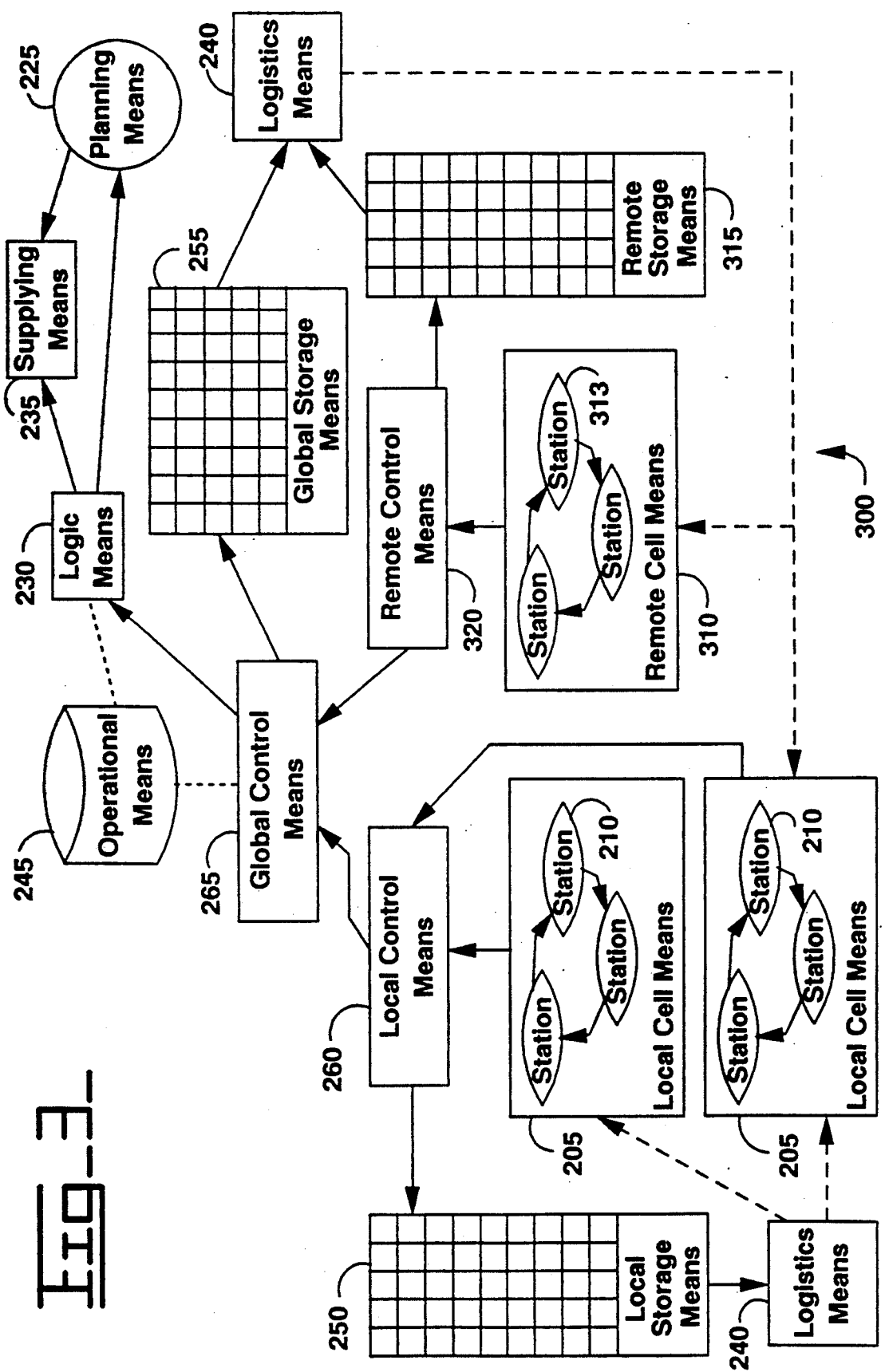
FIG. 3 is a block diagram of another embodiment of the present invention.

FIG. 3 depicts another embodiment of a system 300 for requisitioning and distributing material in a manufacturing environment. The system 300 includes at least one local cell means 205 for storing and utilizing the material and producing a first Missing Resource Signal (MRS) in response to depleting a predetermined amount of the material in the local cell means 205. The local cell means 205 contains one or more manufacturing stations 307, at which a set of manufacturing or assembly operations are performed. The system 300 also includes the local storage means 250 for storing the material. The instant embodiment of the present invention consists of a plurality of local cell means 205 and local storage means 250. Additionally, several local cell means 205 may have access to the same local storage means 250. Material present in the local storage means 250 may be designated as belonging to a particular local cell means 205, and may not be delivered to any other local cell means 205. For example, when material is delivered to the local cell means 205 and the local cell means 205 does not have sufficient storage space to store the entire amount of material, the remaining material is transferred to the local storage means 250. The transferred material is now treated by the system software as belonging to the local cell means 205.

Several local cell means 205 and the local storage means 250 are electronically connected to the local control means 260, which receives the first MRS, responsively searches the local storage means 250, and produces the MTC in response the presence of the material in the local storage means 250, and produces the second MRS in response to the absence of the material in the local storage means 250. The local control means 260 regulates material movement and utilization for one or more local cell means 205 and the local storage means 250.

The system 300 includes at least one remote cell means 310 for storing and utilizing the material. The remote cell means 310 contains one or more manufacturing stations 313, at which a set of manufacturing or assembly operations are performed. The remote cell means 310 contains limited storage space for holding material, therefore a remote storage means 315 is needed for storing the material.

The system 300 also includes a remote control means 320 that is electronically connected to the remote cell means 310 and the remote storage means 315. Preferably, the remote control means 320 includes a computer system (not shown) electronically connected to the system mainframe, and is at the same level as the local control means 260 in the system hierarchy. The remote control means 320 controls the movement of the material between the remote storage means 315 and the remote cell means 310.

The system 300 also includes the global storage means 255 for temporarily storing the material. The global storage means 255 for example, stores material ordered according to the material schedule that is not immediately needed by the local local cell means 205 or remote cell means 310. The global storage means 255 is electronically connected to the global control means 265. The global control means 265 receives the second MRS and responsively searches the remote storage means 315, and produces the MTC in response to the presence of the material in the remote storage means 315. Additionally, if material is not present in the remote storage means 315, the global control means 265 searches the global storage means 255 and produces a MTC in response to the presence of the material in the global storage means 255. Furthermore, the global control means 265 produces the Pull Trigger signal in response to the absence of the material in the remote storage means 315 and the global storage means 255.

Therefore, the system 300 is able to search not only the local storage means 250 for material requested by the local cell means 205; the system 300 advantageously searches the remote and global storage means 315,255 if material is not found at the local control level. The system 300 is not limited to searching one remote control level, but may search a plurality of remote control levels, thus assuring the least amount of material residing in the system 300.

The system 300 includes the planning means 225 for producing a material schedule and a logic means 230 for receiving the Pull Trigger signal and producing the depletion signal in response to the Pull Trigger signal and the material schedule. The logic means 230 also produces the exception signal in response to a deviation from the material schedule being reflected by the Pull Trigger signal. The planning means 225 receives the exception signal and responsively modifies the material schedule.

The system 300 includes at least one supplying means 235 which receives the depletion signal and responsively produces the material to be utilized by the local cell means 205. There may be more than one supplying means 235, and these may be external or internal to the system 300. External supplying means 235 exist outside the manufacturing environment of the system 300, and internal supplying means exist within the system 300 and may include a local cell means 205. The system 300 also includes the logistics means 240 for receiving the MTC from either the local control means 260, remote control means 320, or global control means 265, and responsively moving the material from the local, remote, or global storage means 250,315,255 to the local cell means 205.

The system 300 includes the operational means 245 for maintaining an inventory list of the material contained in the local cell means 205, the remote cell means 310, and the local, global, and remote storage means 250,255,315. The operational means 245 consists of a data base integrated into the controlling software of the system 300 located in the system mainframe. The local, global, and remote control means 260,265,320 access the data base to determine the amount of the material in the respective storage means 250,255,315, and update the inventory list when the MTC and Pull Trigger signal are produced.

INDUSTRIAL APPLICABILITY

The operation of the present invention is best described in relation to examples of material replenishment by material type classification, as described below. In each example it is assumed that the requested material is not found in the local, remote, and global storage means 255,315,265 and is not produced by any other local or remote cell means 305,310 within the system 300. The material quantities and delivery dates are used for exemplary purposes only. The system 300 is not limited to the quantities and dates presented, nor is the system 300 to be represented by such. Each example below presents a different scenario which may occur during operation of one embodiment of the instant invention.

EXAMPLE 1

Type 0 material classification is for material only available from a supplying means 235 not yet equipped to respond to the depletion signal. Therefore, the supplying means 235 produces and delivers the material only according to the material schedule.

EXAMPLE 2

Assume that type 1 material is found to be in short supply by a local cell means 205 on May 5. The local cell means 205 delivers a first MRS to the local control means 260. Responsively, the local control means 260 searches the material inventory list corresponding to the local storage means 250. Since the local control means 260 does not locate the material, a second MRS is delivered to the global control means 265. Responsively, the global control means 265 searches the material inventory list corresponding to the remote storage means 315 and global storage means 255, and since the global control means 265 does not locate the material, the global control means 265 delivers a Pull Trigger signal to the logic means 230. The logic means 230 interacts with the material schedule which indicates that the material is scheduled to be delivered in 15 days, for example on May 20. Previously, the local control means 260 determined that the material is needed in 5 days, which is responsive to the lead time and the time the existing material is expected to remain; therefore, the depletion signal is delivered to the supplying means 235 authorizing the supplying means 235 to advance the May 20 delivery date to May 10. Also, the logic means 230 delivers an exception signal to the planning means 225. A material planner modifies future material schedules to reflect the material shortage. Additionally, if the shortage had not occurred, the material would have been delivered on May 20, as indicated by the material schedule.

EXAMPLE 3

Assume that a local cell means 205 produces a first MRS when the inventory list for type 2 or 4 material decrements to a value equal to the minimum value. For example, the material schedule indicates 30 parts of type 2 or 4 material are to be utilized in May, and 30 parts of the same material are to be utilized in June by the local cell means 205. The planning means 225 requires a maximum value of 40 parts of material and a minimum value of 10 parts of material to reside with the local cell means 205. On May 20 the material inventory list decrements to a value of 10 parts of material, and consequently the local cell means 205 produces a first MRS. If material is not found in the local, remote, and global storage means 250,315,255, the global control means 265 responsively produces a Pull Trigger signal. The Pull Trigger signal specifies that 30 parts of material to be delivered to the local cell means 205, assuming a material lead time to be 10 days. The logic means 230 receives the Pull Trigger signal and responsively delivers the depletion signal to the supplying means 235. The supplying means 235 delivers the material to the local cell means 205 in response to receiving the depletion signal. In this example, the material schedule reflected the anticipated demand; therefore, the supplying means 235 produced the material in response to the material schedule and material was delivered in a Just In Time (JIT) fashion.

EXAMPLE 4

Assume that a local cell means 205 determines the day and time type 2 or 4 material will be needed. For example, on May 10 material is determined to be needed in 5 days and the corresponding lead time is 5 days; consequently, the first MRS signal is produced by the local cell means 205. Assuming material is not located by the local control means 260 and subsequently material is not located by the global control means 265, the logic means 230 receives the Pull Trigger signal and delivers the depletion signal to the supplying means 235, which delivers material to the local cell means 205 by May 15, again in a JIT fashion.

EXAMPLE 5

In this example, assume the local cell means 205 is to stop utilizing type 2 or 4 material for a predetermined period of time, dictated by the planning means 225. Once the local cell means 205 utilizes an amount of material corresponding to the minimum value, the first MRS signal will not be produced. However, the material schedule indicates that the material is planned for delivery in 8 days, for example. The supplying means 235 will not receive the depletion signal and advantageously, the material will not be delivered to the local cell means 205. Thus type 2 or material will not be delivered until a depletion signal is received by the supplying means 235.

EXAMPLE 6

Type 3 material replenishment is based on a two container replenishment method. For example, two containers with material are maintained at the local cell means 205. When one of the containers is emptied, the first MRS signal is generated which prompts the local control means 260 and subsequently the global control means 265 to search for the material. If the material is not located, the logic means 230 receives the Pull Trigger signal and responsively delivers the depletion signal to the supplying means 235. Consequently, the material is delivered to local cell means 205 by the supplying means 235. For type 3 material, the quantity of material is predetermined and the material schedule is not consulted nor modified.

As shown by the previous examples, the system 300 can adapt quickly in response to changes in the manufacturing environment, thus insuring that material is delivered to the point of use in a JIT manner, resulting in low material inventory.

Other aspects, objects, and advantages of this invention can be obtained from a study of the drawings, the disclosure, and the appended claims.

We claim:

1. A system for requisitioning and distributing material in a manufacturing environment, comprising:
   local cell means for storing and utilizing material and producing a first missing resource signal in response to the amount of material in said local cell means being equal to a predetermined minimum value;
   storage means for storing said material;
   control means for receiving said first missing resource signal, responsively searching said storage means, producing a material transfer command signal in response to the presence of said material, and producing a pull trigger signal in response to the absence of said material;
   logistics means for receiving said material transfer command signal and responsively moving said material from said storage means to said local cell means;
   planning means for producing a material schedule; and
   logic means for receiving said pull trigger signal and said material schedule, and producing a depletion signal in response to said pull trigger signal and said material schedule.

2. A system for requisitioning and distributing material in a manufacturing environment, as set forth in claim 1, including supplying means for receiving said depletion signal and responsively delivering said material to said local cell means.

3. A system for requisitioning and distributing material in a manufacturing environment, as set forth in claim 2, wherein said logic means is responsive to a predetermined lead time required to deliver the material from said supplying means to said local cell means.

4. A system for requisitioning and distributing material in a manufacturing environment, as set forth in claim 2, wherein said supplying means includes means for delivering said material to said local cell means in response only to said material schedule.

5. A system for requisitioning and distributing material in a manufacturing environment, as set forth in claim 1, wherein said logical means includes means for producing an exception signal in response to said pull trigger signal and said material schedule.

6. A system for requisitioning and distributing material in a manufacturing environment, as set forth in claim 5, wherein said planning means includes means for receiving said exception signal and responsively modifying said material schedule.

7. A system for requisitioning and distributing material in a manufacturing environment, as set forth in claim 1, including operational means for maintaining an inventory list of said material contained in said local cell means and said storage means.

8. A system for requisitioning and distributing material in a manufacturing environment, as set forth in claim 7, wherein said control means searches said storage means by accessing said material inventory list.

9. A system for requisitioning and distributing material in a manufacturing environment, as set forth in claim 7, wherein said control means updates said material inventory list in response to producing said material transfer command signal.

10. A system for requisitioning and distributing material in a manufacturing environment, as set forth in claim 1, wherein said planning means classifies said material into various types, in response to said material schedule.

11. A system for requisitioning and distributing material in a manufacturing environment, as set forth in claim 10, wherein said logic means distinguishes between said material types and producing said depletion signal in response to said material types.

12. A system for requisitioning and distributing material in a manufacturing environment, as set forth in claim 1, wherein said local cell means includes a manufacturing station adapted to manufacture a product.

13. A system for requisitioning and distributing material in a manufacturing environment, as set forth in claim 1, wherein said storage means includes:
   local storage means for storing said material used by said local cell means; and
   global storage means for temporarily storing said material.

14. A system for requisitioning and distributing material in a manufacturing environment, as set forth in claim 13, wherein said control means includes:
   local control means for receiving said first missing resource signal, responsively searching said local storage means, producing a material transfer command signal in response to the presence of said material, and producing a second missing resource signal in response to the absence of said material; and global control means for receiving said second missing resource signal, responsively searching said global storage means, producing a material transfer command signal in response to the presence of said material, and producing a pull trigger signal in response to the absence of said material.

15. A system for requisitioning and distributing material in a manufacturing environment, as set forth in claim 14, wherein said logistics means moves said material from local storage means to said local cell means, in response to receiving said material transfer command signal from said local control means.

16. A system for requisitioning and distributing material in a manufacturing environment, as set forth in claim 14, wherein said logistics means moves said material from global storage means to said local cell means, in response to receiving said material transfer command signal from said global control means.

17. A system for requisitioning and distributing material in a manufacturing environment, as set forth in claim 1, wherein the predetermined minimum value is based on a predetermined lead time required to deliver material from said supplying means to said local cell means.

18. A system for requisitioning and distributing material in a manufacturing environment, comprising:
   local cell means for storing and utilizing material and producing a first missing resource signal in response to the amount of material in said local cell means being equal to a predetermined minimum value;
   local storage means for storing said material;
   local control means for receiving said first missing resource signal, responsively searching said local storage means, producing a material transfer command signal in response to the presence of said material, and producing a second missing resource signal in response to the absence of said material;
   logistics means for receiving said material transfer command signal and responsively moving said material from said local storage means to said local cell means;
   global storage means for storing said material;
   global control means for receiving said second missing resource signal, responsively searching said global storage means, producing a material transfer command signal in response to the presence of said material, and producing a pull trigger signal in response to the absence of said material;
   planning means for producing a material schedule; and
   logical means for receiving said pull trigger signal and said material schedule, and producing a depletion signal in response to said pull trigger signal and said material schedule.

19. A system for requisitioning and distributing material in a manufacturing environment, as set forth in claim 18, including supplying means for receiving said depletion signal and responsively delivering said material to said local cell means.

20. A system for requisitioning and distributing material in a manufacturing environment, as set forth in claim 18, wherein said logic means includes means for producing an exception signal in response to said pull trigger signal and said material schedule.

21. A system for requisitioning and distributing material in a manufacturing environment, as set forth in claim 20, wherein said planning means includes means for receiving said exception signal and responsively modifying said material schedule.

22. A system for requisitioning and distributing material in a manufacturing environment, as set forth in claim 18, wherein said logistics means moves said material from said global storage means to said local cell means in response to receiving said material transfer command signal signal from said global control means.

23. A system for requisitioning and distributing material in a manufacturing environment, as set forth in claim 18, including:
   remote cell means for storing and utilizing material;
   remote storage means for storing said material; and
   remote control means for controlling the movement of said material in said remote cell and remote storage means.

24. A system for requisitioning and distributing material in a manufacturing environment, as set forth in claim 23, wherein said global control means includes means for searching said remote storage means, in response to receiving said second missing resource signal, and producing a material transfer command signal in response to the presence of said material.

25. A system for requisitioning and distributing material in a manufacturing environment, as set forth in claim 24, wherein said logistics means moves said material from said remote storage means to said local cell means, in response to receiving said material transfer command signal from said global control means.

26. A system for requisitioning and distributing material in a manufacturing environment, as set forth in claim 23, including operational means for maintaining inventory lists of the material contained in said local and remote cell means, and said local, global, and remote storage means.

27. A system for requisitioning and distributing material in a manufacturing environment, as set forth in claim 26, wherein said local, global and remote control means search said local, global, and remote storage means by interacting with said material inventory list.

28. A method for requisitioning and distributing material in a manufacturing environment, wherein the manufacturing environment includes a local manufacturing station adapted to utilize the material, a local storage unit adapted to store the material, and a logistics unit adapted to move the material, comprising the steps of:
   utilizing said stored material and producing a first missing resource signal in response to the amount of material in said local storage unit being equal to a predetermined minimum value;
   receiving said first missing resource signal, responsively searching said local storage unit, producing a material transfer command signal in response to the presence of said material, and producing a pull trigger signal in response to the absence of said material;
   producing a material schedule; and
   receiving said pull trigger signal and said material schedule, and producing a depletion signal in response to said pull trigger signal and said material schedule.

29. A method for requisitioning and distributing material in a manufacturing environment, as set forth in claim 28, including the step of receiving said depletion signal and responsively delivering said material to said local manufacturing station.

30. A method for requisitioning and distributing material in a manufacturing environment, as set forth in claim 29, wherein said step of producing said depletion signal is responsive to a predetermined lead time required to deliver the material to said local manufacturing station.

31. A method for requisitioning and distributing material in a manufacturing environment, as set forth in claim 29, wherein said step of delivering said material is responsive only to said material schedule.

32. A method for requisitioning and distributing material in a manufacturing environment, as set forth in claim 28, including the step of producing an exception signal in response to said pull trigger signal and said material schedule.

33. A method for requisitioning and distributing material in a manufacturing environment, as set forth in claim 32, including the step of receiving said exception signal and responsively modifying said material schedule.

34. A method for requisitioning and distributing material in a manufacturing environment, as set forth in claim 28, including the step of receiving said material transfer command signal and responsively moving said material from said local storage unit to said local manufacturing station.

35. A method for requisitioning and distributing material in a manufacturing environment, as set forth in claim 28, including the step of maintaining an inventory list of said material.

36. A method for requisitioning and distributing material in a manufacturing environment, as set forth in claim 35, including the step of searching said local storage unit by accessing said material inventory list.

37. A method for requisitioning and distributing material in a manufacturing environment, as set forth in claim 35, including the step of updating said material inventory list in response to producing said material transfer command signal.

38. A method for requisitioning and distributing material in a manufacturing environment, as set forth in claim 28, including the step of classifying said material into various types in response to said material schedule.

39. A method for requisitioning and distributing material in a manufacturing environment, as set forth in claim 38, wherein said step of producing said depletion signal includes the step of distinguishing between said material types and producing said depletion signal in response to said material types.

40. A method for requisitioning and distributing material in a manufacturing environment, wherein the manufacturing environment includes a local and remote manufacturing station adapted to utilize the material and a local, global, remote storage unit adapted to store the material, and a logistics unit adapted to move the material, comprising the steps of:
utilizing said stored material and producing a first missing resource signal in response to the amount of material in said local manufacturing station being equal to a predetermined minimum value;
receiving said first missing resource signal, responsively searching said local storage unit, producing a material transfer command signal in response to the presence of said material, and producing a second missing signal in response to the absence of said material;
receiving said second missing resource signal, responsively searching said global storage unit, producing a material transfer command signal in response to the presence of said material, and producing a pull trigger signal in response to the absence of said material;
producing a material schedule; and
receiving said pull trigger signal and said material schedule, and producing a depletion signal in response to said pull trigger signal and said material schedule.

41. A method for requisitioning and distributing material in a manufacturing environment, as set forth in claim 40, including the step of receiving said depletion signal and responsively delivering said material to said local manufacturing station.

42. A method for requisitioning and distributing material in a manufacturing environment, as set forth in claim 40, including the step of producing an exception signal in response to said pull trigger signal and said material schedule.

43. A method for requisitioning and distributing material in a manufacturing environment, as set forth in claim 42, including the step of receiving said exception signal and responsively modifying said material schedule.

44. A method for requisitioning and distributing material in a manufacturing environment, as set forth in claim 40, including the step of receiving said material transfer command signal signal and responsively moving said material from said local storage unit to said local manufacturing station.

45. A method for requisitioning and distributing material in a manufacturing environment, as set forth in claim 40, including the step of moving said material from said global storage unit to said local manufacturing station in response to receiving said material transfer command signal.

46. A method for requisitioning and distributing material in a manufacturing environment, as set forth in claim 40, including the step of searching said remote storage unit, in response to receiving said second missing resource signal, and producing a material transfer command signal in response to the presence of said material.

47. A method for requisitioning and distributing material in a manufacturing environment, as set forth in claim 46, including the step of moving said material from said remote storage unit to said local manufacturing station, in response to receiving said material transfer command signal.

48. A method for requisitioning and distributing material in a manufacturing environment, as set forth in claim 40, including the step of maintaining inventory lists of the material contained in said local manufacturing station, and said local, global, and remote storage unit.

49. A method for requisitioning and distributing material in a manufacturing environment, as set forth in claim 48, including the step of searching said local, global, and remote storage units by interacting with said material inventory lists.

* * * * *

UNITED STATES PATENT AND TRADEMARK OFFICE
CERTIFICATE OF CORRECTION

PATENT NO. : 5,193,065
DATED : March 9, 1993
INVENTOR(S) : Pierre C. Guerindon et al It is certified that error appears in the above-indentified patent and that said Letters Patent is hereby corrected as shown below:

On the title page: Item [75] Inventors: delete

Pierre C. Guerindon, Peoria; Jon E. Barrow, Naperville, both of Ill." and insert --Inventors: Pierre C. Guerindon, Peoria; Jon E. Barrow, Naperville; Bruce G. Dimler, Peoria; Robert W. Hammer, Morton; Dennis A. Putman, Morton; Kenneth R. Setterlund, Peoria; and Darrell T. Vierling, Morton, all of Ill.--.

Claim 5, column 12, line 16, delete "logical" and insert --logic--.

Signed and Sealed this

First Day of March, 1994

BRUCE LEHMAN

Attest:

Attesting Officer

Commissioner of Patents and Trademarks